United States Patent [19]

Dalton, Jr. et al.

[11] 4,346,019

[45] Aug. 24, 1982

[54] STABILIZATION AND REGENERATION OF ACTIVATED CARBON SUPPORTED PALLADIUM CHLORIDE CATALYSTS IN THE OXIDATION OF VINYL HALIDES

[75] Inventors: Augustine I. Dalton, Jr., Allentown; Shivaji Sircar, Wescosville, both of Pa.

[73] Assignee: Air Products and Chemicals, Inc., Allentown, Pa.

[21] Appl. No.: 276,240

[22] Filed: Jun. 22, 1981

[51] Int. Cl.³ .................. B01J 27/32; B01D 53/34
[52] U.S. Cl. .................. 252/416; 423/240; 423/245
[58] Field of Search ............... 252/416, 419; 423/240 S, 245 S

[56] References Cited

U.S. PATENT DOCUMENTS

| | | | |
|---|---|---|---|
| 3,067,002 | 12/1962 | Reid, Jr. ............... | 423/213.5 |
| 3,150,922 | 9/1964 | Ashley ............... | 423/213.2 |
| 3,658,724 | 4/1972 | Stiles ............... | 252/446 |
| 3,796,023 | 3/1974 | Raduly ............... | 55/59 |
| 3,807,138 | 4/1974 | Bellisio ............... | 55/71 |
| 4,025,605 | 5/1977 | Dalton, Jr. et al. ....... | 423/240 |

FOREIGN PATENT DOCUMENTS 902136 7/1962 United Kingdom ............... 423/245

*Primary Examiner*—P. E. Konopka
*Attorney, Agent, or Firm*—Richard A. Dannells, Jr.; E. Eugene Innis; James C. Simmons

[57] ABSTRACT

$PdCl_2$/C catalyst which has been deactivated in the oxidation of an olefinic halide or olefinic hydrocarbon present as contaminant in air or other inert oxygen-containing gas stream, is regenerated by prolonged exposure to air or other oxygen-containing gas stream at temperatures below 70° C. and preferably below 60° C.

9 Claims, No Drawings

STABILIZATION AND REGENERATION OF ACTIVATED CARBON SUPPORTED PALLADIUM CHLORIDE CATALYSTS IN THE OXIDATION OF VINYL HALIDES

TECHNICAL FIELD

This invention relates generally to processes for the removal of deleterious organic contaminants from an oxygen-containing inert gas stream and is more particularly concerned with the oxidative regeneration of carbon-supported palladium halide catalyst employed in such processes.

BACKGROUND OF THE PRIOR ART

The previously known methods for removing or reducing the concentration of dilute contaminants in the atmosphere are reviewed in U.S. Pat. No. 4,025,605 issued to the present inventors. The disadvantages encountered in the therein listed prior art methods are avoided by the process advocated in the said U.S. Pat. No. 4,025,605. As therein described, the oxidizable organic contaminants are removed from an oxygen-containing inert gas by adsorption in a reaction zone on a sorptive medium, such as adsorbent carbon, in the presence of an oxidation catalyst. The rich adsorbent is then thermally desorbed and oxidized to innocuous reaction products which can be safely discharged to the atmosphere.

The oxidation catalyst employed in the reaction zone described in said patent is platinum or palladium or a salt of either of these, enabling oxidative destruction of the contaminants at lower temperatures than heretofore required and without significant combustion of the carbon adsorbent. The temperature range set out in the patent is from as low as 90° C. to an upper limit prescribed by the ignition temperature of the particular carbonaceous adsorbent. Temperatures in the range of 90° C. to about 200° C. can be employed and preferably in the range of 120°–180° C. Under these conditions for oxidation of the desorbed contaminants the adsorbent capacity of the adsorbent is regenerated.

Among the useful applications of the invention described in the aforesaid patent is that of removing residual vinyl chloride in exhaust streams from polyvinyl chloride synthesis plants.

The several examples of the patent relate to the use of $PdCl_2$ on activated carbon for the adsorption of the VCM (vinyl chloride monomer) from an air stream, and for subsequent catalytic oxidation of the desorbed VCM. In the case of palladium chloride as catalyst in the reaction of the vinyl chloride monomer, hydrolysis may occur in addition to oxidation. Accordingly, it is desirable, in the case of palladium chloride catalysts, to have water vapor present in the reaction zone during the oxidation reaction. This water vapor may come from the gaseous feed or may be added at some point prior to or during the reaction step in the cycle.

While the method described in the aforesaid patent has been found effective in many of its applications, certain difficulties have been encountered when the contaminant in the air or other oxygen-containing inert gas stream is a vinyl halide, such as vinyl chloride. In such case, the palladium halide catalyst becomes progressively deactivated at a relatively rapid rate.

BRIEF SUMMARY OF THE INVENTION

In accordance with the present invention the disadvantages heretofore encountered in prior art methods for removing low concentrations of oxidizable organic contaminants from an oxygen-containing inert gas are avoided and the difficulties had in the methods of U.S. Pat. No. 4,025,065 with respect to deactivation of palladium halide catalyst are overcome. It has now been found, in accordance with the present invention, that spent $PdCl_2$ catalyst used in the oxidation of olefinically unsaturated organic compounds, can be readily regenerated by prolonged exposure to an oxygen-containing gas at low temperatures in the range of from about −25° C. to 70° C. More particularly, it has been found that the addition of water (in a quantity below the dew point) to the gas phase oxidation stream, considerably retards the deactivation of carbon-supported $PdCl_2$ catalysts used in the oxidation of vinyl halides, thereby enabling the oxidation to be effected at low temperatures, with consequent lower rate of deactivation and further facilitating regeneration of the catalyst at the low temperatures indicated.

DETAILED DESCRIPTION

Supported palladium chloride catalysts are commercially available, including those supported on activated or adsorptive carbon. Such catalyst can readily be prepared at desired concentration of palladium by impregnation of the support with the palladium salt. Thus, in certain of the examples below, commercially available activated carbon was washed in boiling dilute nitric acid, followed by water washing and then dried. Impregnation was effected with a hydrochloric acid solution of $PdCl_2$ in the desired amount. After adsorption of the palladium was complete, the impregnated carbon was filtered, washed with cold water and allowed to air dry followed by drying in an evacuated desiccator.

In the initial experimental work leading to the present invention it was found that noble metal catalysts are deactivated in the course of oxidation of vinyl halides, such as vinyl chloride and that the rate of vinyl chloride oxidation increases with reaction temperature. At each temperature the catalyst rapidly deactivates as shown by the decrease in rate of reaction with each cycle. The following examples illustrate the extent of deactivation at various temperatures with repeated oxidation cycles.

EXAMPLES 1 to 6

A reactor was charged with 1.6% $PdCl_2$ on RB grade activated carbon (12×30 mesh). A vinyl chloride-air mix was circulated over the catalyst bed for several cycles at the indicated reaction conditions. For each example a fresh charge of catalyst was utilized. The concentration of vinyl chloride in withdrawn samples of the oxidized product gas were analyzed as a function of time using a vapor phase chromatograph equipped with a flame ionization detector. The results are summarized in Table 1 below in terms of the reaction rate constant of the catalyst (K) indicating the extent of VCM oxidation and reported as $K \times 10^{-1}$ min$^{-1}$ gm cat$^{-1}$.

TABLE 1

| Example | VCM conc. ppm | Temp. Range °C. | Cycle | $K \times 10^{-1}$ min$^{-1}$ gm. cat$^{-1}$ |
|---|---|---|---|---|
| 1 | 264 | 124–127 | 1 | 2.4 |
|   |     | 123–125 | 2 | 2.6 |

TABLE 1-continued

| Example | VCM conc. ppm | Temp. Range °C. | Cycle | K × 10$^{-1}$ min$^{-1}$ gm. cat$^{-1}$ |
|---|---|---|---|---|
| | 1130 | 124–126 | 3 | 1.8 |
| 2 | 264 | 148–152 | 1 | 7.2 |
| | | 147–152 | 2 | 7.2 |
| | | 147–151 | 3 | 6.3 |
| | | 147–151 | 4 | 5.7 |
| | | 146–149 | 5 | 6.0 |
| | | 145–150 | 6 | 5.7 |
| | 1130 | 147–151 | 7 | 4.0 |
| 3 | 1130 | 150 | 1 | 4.1 |
| 4 | 1130 | 157 | 1 | 4.0 |
| | | 160 | 2 | 4.9 |
| | | 159 | 3 | 4.6 |
| | | 162 | 4 | 4.0 |
| | | 163 | 5 | 3.3 |
| | | 163 | 6 | 2.3 |
| 5 | 1130 | 174–176 | 1 | 10.0 |
| | | 175–176 | 2 | 7.5 |
| | | 174–176 | 3 | 4.4 |
| 6 | 5520 | 174–176 | 1 | 7.8 |
| | | 173–178 | 1 | 8.3 |

The runs in Examples 1 to 6 were carried out in the absence of water addition to the air-VCM mix (other than contained ambient moisture). In Examples 7 to 11 below, water was added to the gas phase leading to a relative humidity of respectively 40% and 80%. Fresh 1.6% PdCl$_2$/C catalyst was utilized for each example. At the indicated condition, the humidified vinyl chloride-air mix was cycled over the catalyst bed several times and the concentration of vinyl chloride monitored as a function of time. The results are summarized in Table 2 below.

TABLE 2

| Example | VCM conc. ppm | Temp. Range °C. | Relative Humidity % | Cycle | K × 10$^2$ min$^{-1}$ gm. cat$^{-1}$ |
|---|---|---|---|---|---|
| 7 | 1000–1150 | 104–111 | 40 | 1 | 0.64 |
| 8 | 1000–1150 | 125–127 | 40 | 1 | 1.9 |
| | | 127–127 | | 2 | 1.8 |
| 9 | 1000–1150 | 148–151 | 40 | 1 | 4.6 |
| | | 148–150 | | 2 | 3.7 |
| | | 148–150 | | 3 | 3.8 |
| | | 149–151 | | 4 | 3.5 |
| | | 147–151 | | 5 | 3.1 |
| | | 149–151 | | 6 | 3.3 |
| | | 148–151 | | 7 | — |
| | | 150–152 | | 8 | 2.8 |
| | | 148–150 | | 9–10 | — |
| | | 149–152 | | 11 | 3.0 |
| 10 | 1000–1150 | 148–152 | 80 | 1 | 4.1 |
| | | 149–151 | | 2 | 4.0 |
| 11 | 1000–1150 | 167–171 | 40 | 1 | 6.4 |
| | | 168–169 | | 2 | 6.0 |
| | | 168–169 | | 3 | 5.2 |
| | | 165–171 | | 4 | 4.2 |
| | | 169–170 | | 5 | 3.8 |
| | | 169–170 | | 6 | 3.5 |

The results reported in Table 2 show that in contrast to ambient moisture, addition of water leads to an extended catalyst life without significantly altering the reaction rate. Furthermore, it is seen that the effect of water on catalyst lifetime is more pronounced at the lower temperature; that is, at temperatures approaching 170° C. deactivation is still significant. Without being bound to any particular theory, it is believed from the observed data that a primary function of the water is to interact with the catalyst in addition to entering the primary reaction of vinyl chloride.

The following examples illustrate the effect of regeneration conditions on the restoration of the activity of spent PdCl$_2$/C catalyst used in oxidation of vinyl chloride-air mixes.

EXAMPLE 12

Deactivated 1.6 PdCl$_2$/C catalyst which had been deactivated in use for the oxidation of vinyl chloride in an air stream containing 1130 ppm VCM, as in Examples 1–6, was exposed to various regenerative conditions and re-evaluated as to its regenerated activity for the oxidation of vinyl chloride. The results are summarized in Table 3.

TABLE 3

| Regeneration number | Regenerative Treatment | | | *K × 10$^{-2}$ |
|---|---|---|---|---|
| | atm | T° C. | Time (hrs) | min$^{-1}$ grams$^{-1}$ |
| 1 | air | −17 | 168 | 3.5 (b) |
| 2 | air | 0 | 144 | 3.4 (b) |
| 3 | air | 23 | 27 | 3.0 (c) |
| 4 | air | 23 | 94 | 3.3 (c) |
| 5 | air | 23 | 191 | 3.0 (c) |
| 6 | oxygen | 23 | 192 | 3.4 (b) |
| 7 | air at 43% RH | 23 | 168 | 3.2 (b) |
| 8 | air | 60 | 29 | 2.9 (c) |
| 9 | air | 60 | 96 | 2.9 (c) |
| 10 | air | 90 | 118 | 2.9 (c) |
| 11 | air | 300 | 144 | 0.7 (b) |

*Fresh catalyst K = 4.1 × 10$^{-2}$, 150° C. using 1130 ppm VCM in air
(b) Deactivated Catalyst K = 2.0 × 10$^{-2}$
(c) Deactivated Catalyst K = 2.8 × 10$^{-2}$ From the results reported in Table 3, it is evident that the catalyst can be essentially recovered by prolonged exposure to ambient air at low to moderate temperatures. The use of oxygen in high concentration is somewhat more effective as is also the use of humidified air. Moreover, the data further show that at temperatures approaching ambient superior results are obtained in comparison to that obtained at higher temperatures.

The runs made in the following Example 13 show that the spent catalyst can be repetitively regenerated to its initial activity.

By the same procedure as in the previous examples 1.7315 grams of 1.6% PdCl$_2$/C catalyst was exposed to 1130 ppm VCM-air mix over six cycles. The concentration of vinyl chloride was monitored as a function of time. After the sixth cycle, the deactivated catalyst was allowed to set in ambient air for sixty days and the catalyst then again evaluated over six oxidation cycles. Following evaluation of this first regenerated catalyst, the spent catalyst was then allowed to set in ambient air for 16 days and re-evaluated over three cycles in the oxidation of vinyl chloride. The results are summarized in Table 4, using 1130 ppm VCM/air.

TABLE 4

| Cycle | Fresh Cat. | 1st Regeneration after 60 days storage from last deactivation | 2nd Regeneration after 16 days storage from last deactivation |
|---|---|---|---|
| 1 | 4.03 × 10$^{-2}$ | 4.82 × 10$^{-2}$ | 4.02 × 10$^{-2}$ |
| 2 | 4.93 × 10$^{-2}$ | 3.89 × 10$^{-2}$ | 2.99 × 10$^{-2}$ |
| 3 | 4.59 × 10$^{-2}$ | 3.10 × 10$^{-2}$ | 2.99 × 10$^{-2}$ |
| 4 | 4.03 × 10$^{-2}$ | 2.26 × 10$^{-2}$ | |
| 5 | 3.25 × 10$^{-2}$ | 2.04 × 10$^{-2}$ | |
| 6 | 2.33 × 10$^{-2}$ | (a)1.44 × 10$^{-2}$ | |

(a)After 16 days storage from last deactivation.

The mechanism accounting for the deactivation of the PdCl$_2$ catalyst is not fully understood. It has also been observed when using 5% Pt/C catalyst in the oxidation of VCM. In the case of platinum catalyst, however, the rate of deactivation could be minimized by operating at higher temperatures, such as at 300° C., since at these higher temperatures the effect of catalyst poisoning by the HCl reaction product is minimized, provided that the temperatures utilized are not sufficiently high to effect undesired oxidation of the activated carbon adsorbent.

While the above examples describe the regeneration of carbon supported palladium halide catalyst used in the oxidation of vinyl chloride in an air mixture, the regeneration procedure of the present invention is not limited thereto. Palladium halide catalyst supported on or in intimate association with an activated carbon adsorbent can also be employed in the oxidation of other olefinic halides as well as in the oxidation of olefinic hydrocarbons present in an otherwise inert oxygen gas stream. Such would be the case, for example, in oxidizing discharged olefinic paint solvent present in a working enclosure or in the oxidation of olefinic gas, such as ethylene, in a hospital room or industrial facility. Palladium halide catalyst deactivated in such uses can be regenerated by the prolonged low temperature exposure to air or other oxygen-containing gas in accordance with the method of the present invention.

Regeneration of the spent palladium halide catalyst can be carried out by discharging the same from the oxidation reactor into a regeneration vessel in which it is exposed to the regenerating medium; or, if desired, the regeneration can be effected in the oxidation reactor after purging and discharge therefrom of the oxidized product gas. In the latter case it is best to employ a plurality of oxidation reactors for continuous operation, so that one or more of the oxidation reactors are successively on stream for adsorption and oxidation of the olefinic contaminant while a companion reactor is being regenerated. The number of reactors thus required will depend on the rate of deactivation permitted before subjecting the catalyst to regeneration.

What is claimed is:

1. The method for regenerating spent palladium halide catalyst impregnated on or admixed with an adsorbent carbon, which catalyst became deactivated in the oxidation of olefinically unsaturated organic compounds, comprising the step of exposing the spent catalyst to an oxygen-containing inert gas at a temperature in the range of $-25°$ C. to $70°$ C. for a period of about 16 to 60 days.

2. The method as defined in claim 1 wherein said catalyst is palladium chloride supported on activated carbon.

3. The method as defined in claims 1 or 2 wherein said unsaturated organic compound is an olefinic halide.

4. The method as defined in claims 1 or 2 wherein said unsaturated organic compound is vinyl chloride.

5. The method as defined in claims 1 or 2 wherein regeneration of said catalyst is effected by exposure to atmosphereic air at substantially ambient temperature.

6. The method as defined in claims 1 or 2 wherein regeneration of said catalyst is effected by exposure to air in the presence of added moisture.

7. The method as defined in claims 1 or 2 wherein said oxygen-containing inert gas contains an oxygen concentration in excess of 21% by volume.

8. In the regeneration of $PdCl_2/C$ catalyst which has been deactivated by use in the oxidation of vinyl chloride monomer contained as a contaminant in an oxygen-containing inert gas stream the method which comprises exposing the spent catalyst for a period of at least 16 days to contact with an oxygen-containing gas stream at a temperature below about $60°$ C.

9. The method as defined in claims 1, 2 or 8 wherein said regeneration is effected at a temperature in the range of $-17°$ C. to $60°$ C.

* * * * *